United States Patent [19]

McLeod et al.

[11] Patent Number: 4,627,061
[45] Date of Patent: Dec. 2, 1986

[54] GAS LASER APPARATUS HAVING CONSTANT POWER OUTPUT

[75] Inventors: John McLeod, Irvine, Calif.; John A. Smith, Linlithgow; Russell A. Leather, Perth, both of Scotland

[73] Assignee: Ferranti, plc, Gatley, England

[21] Appl. No.: 520,309

[22] Filed: Aug. 4, 1983

[30] Foreign Application Priority Data

Aug. 6, 1982 [GB] United Kingdom ............... 8222782

[51] Int. Cl.$^4$ .............................................. H01S 3/10
[52] U.S. Cl. ..................................... 372/29; 313/552; 372/59
[58] Field of Search .................. 372/59, 29, 83, 33; 313/552

[56] References Cited

U.S. PATENT DOCUMENTS

| | | | |
|---|---|---|---|
| 3,876,957 | 4/1975 | Thatcher | 372/59 |
| 3,898,586 | 8/1975 | Nelson et al. | 372/59 |
| 4,224,579 | 9/1980 | Marlett et al. | 372/61 |
| 4,286,468 | 9/1981 | Altman | 350/485 |

FOREIGN PATENT DOCUMENTS

| | | |
|---|---|---|
| 1315700 | 5/1973 | United Kingdom . |
| 1536624 | 10/1978 | United Kingdom . |
| 1602908 | 11/1981 | United Kingdom . |

OTHER PUBLICATIONS

Ernst, "Single-Frequency, Atmospheric Pressure $CO_2$ Laser", *Rev. Sci. Instrum.*, vol. 48, No. 10, Oct. 1977, pp. 1281-1283.

*Primary Examiner*—James W. Davie
*Attorney, Agent, or Firm*—Dennis P. Clarke

[57] ABSTRACT

Gas laser apparatus comprises a cavity 10 containing a gaseous active medium, and discharge electrodes 11 and 12 between which a potential difference may be applied to produce an electric pumping discharge in the active medium. A reservoir 17 communicates with the cavity to form a sealed enclosure containing the active medium and volume control means 19 are contained in the reservoir 17 to vary the pressure of the gaseous active medium in the cavity.

8 Claims, 5 Drawing Figures

GAS LASER APPARATUS HAVING CONSTANT POWER OUTPUT

This invention relates to gas laser apparatus, and in particular to apparatus in which the pressure of gas in a sealed cavity may be controlled.

The power output of a gas laser held at a fixed pressure varies predictably as a function of the gas temperature. Generally the output power is higher at low temperatures than at high temperatures, due to the inherent gain characteristics of the gaseous active medium. This type of behaviour may be compensated in some lasers by varying the pumping energy according to the ambient temperature. However, in some lasers such as the transversely excited atmospheric pressure (TEA) $CO_2$ laser forming the subject of UK Pat. No. 1,301,207, such control is not possible. This is because the discharge current tends to remain constant regardless of variations of the applied voltage within the upper and lower limits defining arcing and extinction of the discharge respectively.

It is known that, to a first approximation, the power extracted from a pulsed gas laser varies as the square of the gas pressure. This is because the pulse width is inversely proportional to pressure, and the required discharge voltage is directly proportional to pressure. Hence if the gas pressure could be controlled as a function of temperature, then a simple temperature-sensitive discharge voltage control circuit could maintain the power output at a constant level.

It is an object of the invention to provide gas laser apparatus in which control of gas pressure is achieved.

According to the present invention there is provided gas laser apparatus which includes a cavity containing a gaseous active medium, discharge electrodes between which a potential difference may be applied to produce an electric pumping discharge in the active medium, a reservoir communicating with the cavity to form a sealed enclosure therewith and containing the said active medium, and volume control means operable to vary the volume of the reservoir containing the active medium so as to vary the pressure of the gaseous active medium within the said cavity.

Preferably the volume control means comprise a body of variable volume located within the reservoir. Control means may be provided to control the volume control means, and may be arranged to vary the pressure of the active medium as a function of its temperature.

The invention will now be described with reference to the accompanying drawings, in which.

Figure 1:
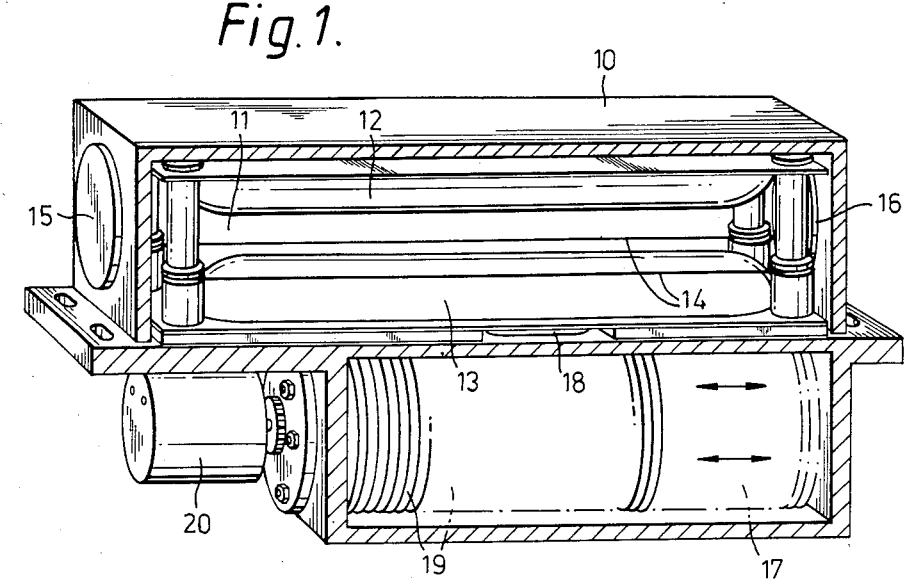
FIG. 1 is a perspective view of a first embodiment of the invention.

Referring now to FIG. 1, a $CO_2$ TEA laser comprises a housing 10 defining a cavity 11 containing the gaseous active medium. Inside the cavity are the anode and cathode discharge electrodes 12 and 13 respectively, and a thin wire trigger electrode 14. The cavity has two end mirrors 15 and 16, one being 100% reflecting whilst the other is partially transmitting to allow the laser output beam to leave the cavity. Formed integral with the laser housing is a reservoir 17 which communicates with the cavity through an opening 18. The reservoir contains a sealed bellows 19 which may be caused to expand or contract longitudinally by a motor 20. The remainder of the reservoir is, of course, filled with the gaseous active medium.

The laser described above is a pulsed laser in which a discharge between the two main electrodes 12 and 13 is initiated transverse to the length of the laser cavity by the trigger electrode 14. Since, as stated earlier, the output power of the laser is dependent upon the pressure of the active medium, then the extension of the bellows 19 may be adjusted by operation of the motor 20 to provide the optimum output power.

Figure 2:
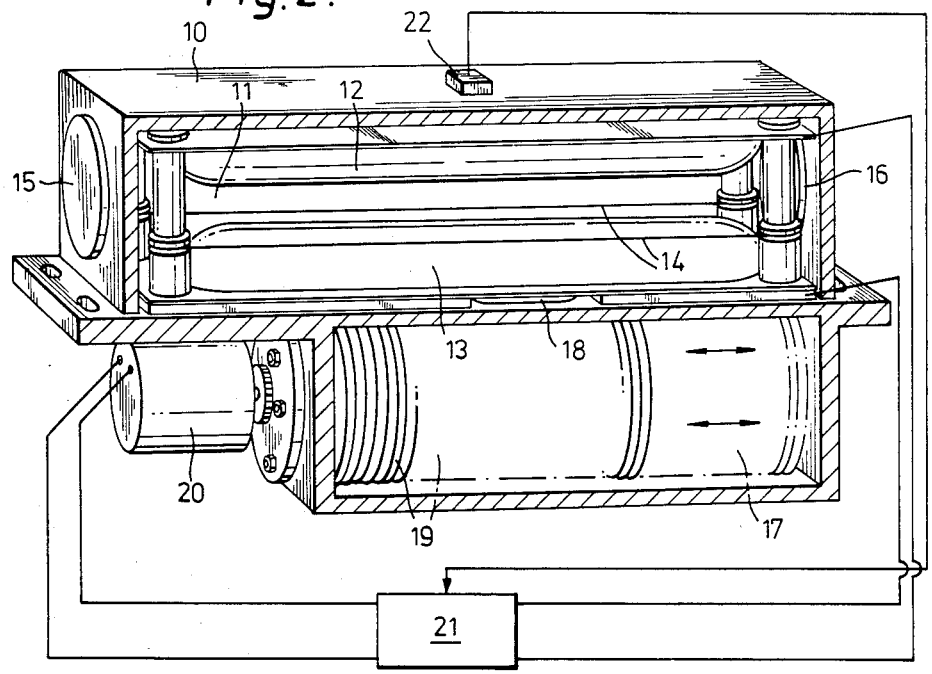
FIG. 2 shows the arrangement of FIG. 1 together with the control apparatus.

As has been stated, the pressure is preferably made dependent upon the temperature of the active medium, and the voltage of the discharge source may also be varied to give the optimum output power. FIG. 2 shows the laser of FIG. 1 together with suitable control apparatus, shown in schematic form.

Referring now to FIG. 2, the motor 20 is powered by the control apparatus 21 which has as a control input the output of a temperature on the housing 10 of the laser. The control apparatus 21 also control the potential difference, and possibly the current, supplied to the laser discharge electrodes 12 and 13. The form of the control apparatus is not detailed here. A simple microprocessor, for example, may be arranged to control the motor and the power supply in accordance with suitable mathematical relationships.

Figure 3:
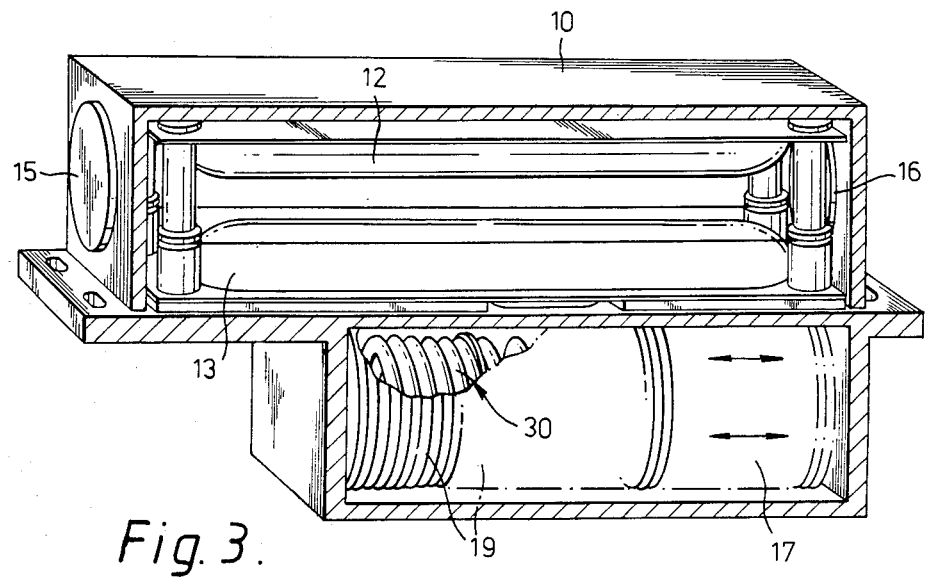
FIG. 3 is a similar view of a second embodiment.

FIG. 3 illustrates an embodiment in which the bellows 19 contain a shape memory effect (SME) spring 30 operating to extend or contract the bellows in accordance with the temperature of the active medium in the reservoir 17. The mode of operation of SME springs is well known, and will not be discussed here. It is sufficient to say that the spring will change between a contracted state and an expanded state over a predetermined range of temperature.

Figure 4:
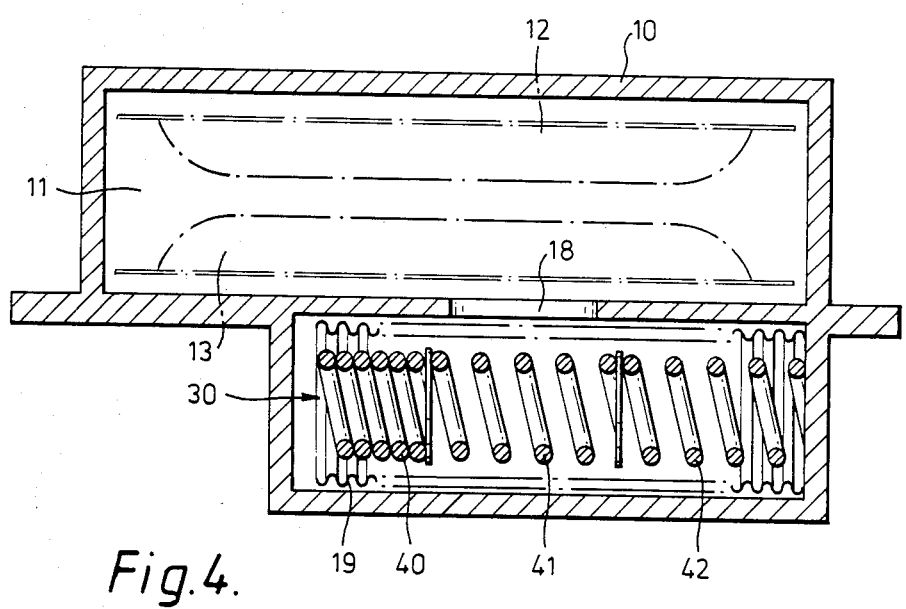
FIG. 4 is a sectional side view showing a modification of the embodiment of FIG. 2.

An increased temperature range for an SME spring-operated bellows may be achieved by using the arrangement shown in FIG. 4. This shows three SME springs 40, 41 and 42, each with a slightly different operating range. Two springs are shown extended and one contracted.

Figure 5:
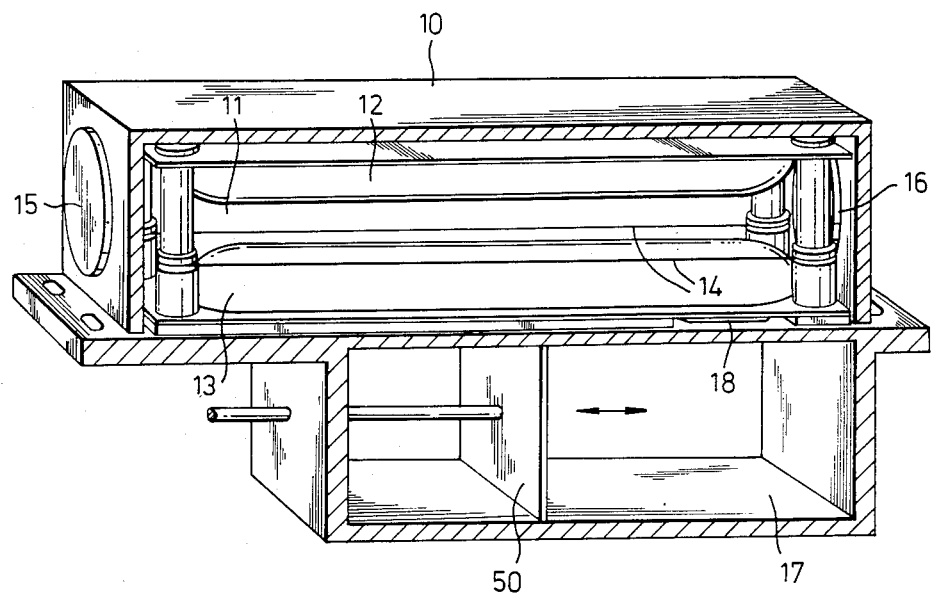
FIG. 5 is a perspective of a further embodiment.

FIG. 5 shows a further embodiment in which the volume of the reservoir 17 is changed by means of a piston 50. This may be moved by some suitable mechanism operated by control apparatus of the type shown in FIG. 2. The pressure variations required are not large, and hence there is no greater difficulty in sealing the piston to the shape of the reservoir.

It will be appreciated that the laser apparatus described above may be used with any gaseous active medium at any desired pressure, though it is particularly suitable for the $CO_2$ TEA laser. Similarly, any electrode arrangement may be used to produce the pumping discharge in the gas, including electrodes located outside the laser cavity and excited by radio-frequency energy. The laser output may be pulsed or continuous.

Other types of volume control means may be used in place of any of those described above.

Facilities may be provided for replenishing the gas mixture in the laser if this becomes necessary.

What we claim is:

1. Gas laser apparatus which includes a cavity containing a gaseous active medium, discharge electrodes between which a potential difference may be applied to produce an electric pumping discharge in said active medium, a reservoir communicating with said cavity to form a sealed enclosure therewith and containing said active medium, and volume control apparatus responsive to the temperature of the gaseous active medium to control the volume of said reservoir containing said active medium and hence the pressure of said gaseous active medium within said cavity in such a manner as to maintain the output power of the apparatus at a constant value.

2. Laser apparatus as claimed in claim 1 in which said volume control means comprises a body of variable volume located within said reservoir.

3. Laser apparatus as claimed in claim 2 in which said body comprises a sealed bellows.

4. Laser apparatus as claimed in claim 3 which includes control apparatus operable to control the volume of said volume control means.

5. Laser apparatus as claimed in claim 4 in which said control apparatus is arranged to expand or contract said bellows in accordance with the temperature of said gaseous active medium.

6. Laser apparatus as claimed in claim 5 in which said control apparatus comprises at least one shape memory effect spring.

7. Laser apparatus as claimed in claim 5 in which said control means comprises a motor operable to expand or contract said bellows in accordance with the output of a temperature sensor.

8. Laser apparatus as claimed in claim 1 in which said volume control apparatus comprises a piston movable to vary the volume of said reservoir.

* * * * *